(12) United States Patent
Ballauf et al.

(10) Patent No.: US 9,935,507 B2
(45) Date of Patent: Apr. 3, 2018

(54) DEVICE COMPRISING AN ELECTRIC MACHINE WITH A LIGHTWEIGHT DESIGN

(71) Applicant: SIEMENS AKTIENGESELLSCHAFT, München (DE)

(72) Inventors: Christian Ballauf, München (DE); Zeljko Jajtic, München (DE); Martin Johannes, Erlangen (DE); Christian Seidel, Schwaig (DE)

(73) Assignee: SIEMENS AKTIENGESELLSCHAFT (DE)

( * ) Notice: Subject to any disclaimer, the term of this patent is extended or adjusted under 35 U.S.C. 154(b) by 444 days.

(21) Appl. No.: 14/426,767

(22) PCT Filed: Sep. 3, 2013

(86) PCT No.: PCT/EP2013/068177
§ 371 (c)(1),
(2) Date: Mar. 9, 2015

(87) PCT Pub. No.: WO2014/040882
PCT Pub. Date: Mar. 20, 2014

(65) Prior Publication Data
US 2015/0214790 A1    Jul. 30, 2015

(30) Foreign Application Priority Data

Sep. 13, 2012  (EP) .................................. 12184238

(51) Int. Cl.
*H02K 1/12* (2006.01)
*H02K 1/18* (2006.01)
(Continued)

(52) U.S. Cl.
CPC ............. *H02K 1/187* (2013.01); *H02K 1/02* (2013.01); *H02K 1/12* (2013.01); *H02K 9/22* (2013.01); *H02K 21/22* (2013.01)

(58) Field of Classification Search
CPC ............ H02K 1/02; H02K 1/187; H02K 1/12; H02K 9/22
See application file for complete search history.

(56) References Cited

U.S. PATENT DOCUMENTS 6,104,570 A * 8/2000 Pelstring .............. G11B 17/038
                                                      360/98.07
6,191,510 B1 * 2/2001 Landin .................... H02K 1/04
                                                      310/216.016
(Continued)

FOREIGN PATENT DOCUMENTS

CN          201075805 Y     6/2008
CN          201146439 Y     11/2008
(Continued)

OTHER PUBLICATIONS

International Search Report PCT/EP2013/068177; International Filing Date: Sep. 3, 2013; 2 pgs.
Canadian Office Action dated Nov. 6, 2017.

*Primary Examiner* — Dang Le
(74) *Attorney, Agent, or Firm* — Schmeiser Olsen & Watts LLP (57) ABSTRACT

A device comprising a base body is provided. A stator pack of an electric machine is connected to the base body by means of a connecting structure. The electric machine includes a rotor which cooperates electromagnetically with the stator pack and is rotatably mounted relative to the stator pack such that the rotor can rotate about the rotational axis. The stator pack is fixed by means of the connecting structure relative to the base body. The stator pack includes a plurality of stator sheets which are stacked on top of each other when
(Continued)

seen in the direction of the rotational axis. Electromagnetically inactive first intermediate layers are arranged at least between certain stator sheets. The first intermediate layers are components of the connecting structure. Torque exerted upon the rotor by means of the stator pack is transferred in the connecting structure by means of the layers.

18 Claims, 6 Drawing Sheets

(51) Int. Cl.
  *H02K 1/02* (2006.01)
  *H02K 9/22* (2006.01)
  H02K 21/22 (2006.01)

(56) References Cited

U.S. PATENT DOCUMENTS 8,183,729 B2 * 5/2012 Takeuchi ............ H02K 15/026
  310/114
2012/0217752 A1 8/2012 Booth et al.

FOREIGN PATENT DOCUMENTS

DE 19846220 A1 4/2000
JP 2003174743 A 6/2003

* cited by examiner

DEVICE COMPRISING AN ELECTRIC MACHINE WITH A LIGHTWEIGHT DESIGN

CROSS-REFERENCE TO RELATED APPLICATIONS

This application claims priority to PCT Application No. PCT/EP2013/068177, having a filing date of Sep. 3, 2013, based on EP 12184238.9 having a filing date of Sep. 13, 2012, the entire contents of which are hereby incorporated by reference.

FIELD OF TECHNOLOGY

Device comprising an electric machine with a lightweight design
The following relates to a device,
wherein the device has a basic body,
wherein a stator stack of an electric machine is connected to the basic body via a connecting structure,
wherein the electric machine has a rotor, which interacts electromagnetically with the stator stack and is mounted rotatably relative to the stator stack so that the rotor is rotatable about an axis of rotation,
wherein the stator stack is fixed relative to the basic body by means of the connecting structure,
wherein the stator stack has a number of stator laminations, which are stacked one on top of the other, when viewed in the direction of the axis of rotation.

BACKGROUND

Such a devices is known, for example, from DE 198 46 220 A1. Virtually any conventional electric motor which has a housing or is installed in a larger device has such a design.

In the context of mobile applications, the power-to-weight ratio of electric motors is very important. In particular, attempts are made to reduce the weight of the electric motors as much as possible. It is desirable to reduce weight both in the case of the so-called active parts (i.e. the electromagnetically active components, i.e. magnets and windings and laminations or laminate stacks) and in the case of the remaining components, the so-called passive parts.

Attempts are generally made in the past to optimize the individual components of the systems. However, a particularly high degree of potential lies in integrative lightweight construction, for example by structural and functional integration of active and passive parts.

SUMMARY

An aspect relates to a device comprising an electric machine with a lightweight design, in which such an integrative lightweight construction is realized.

In accordance with embodiments of the invention, a device of the type mentioned at the outset is further developed in order to achieve the aspect in that
electromagnetically inactive first interlayers are arranged at least between some of the stator laminations,
the first interlayers are parts of the connecting structure, and
a torque exerted by the stator stack on the rotor is introduced into the connecting structure via the first interlayers.

Owing to the first interlayers, the weight of the electric machine is considerably reduced in comparison with a conventional electric machine of the same physical size. The peak power that can be output by means of the electric machine according to embodiments of the invention and which is limited by the magnetic saturation of the stator laminations is lower than in the case of the comparable conventional machine. The continuous power of the electric machine according to embodiments of the invention, which is limited by the heat which can be dissipated from the stator stack, is virtually equal in size to that in the case of the conventional electric machine, however.

It is possible for in each case a first interlayer to be arranged between all of the stator laminations. Alternatively, it is possible for the first interlayers to only be arranged between some of the stator laminations. In this case, electromagnetically inactive second interlayers are preferably arranged between those stator laminations between which no first interlayer is arranged. The second interlayers are not part of the connecting structure. The cut of the second interlayers in this configuration generally corresponds to the cut of the stator laminations. Said second interlayers therefore have the same contour as the stator laminations.

In the case of the presence of the second interlayers, a predetermined number of second interlayers is arranged between in each case two first interlayers, wherein the number of second interlayers is generally always the same. It is possible for in each case a single second interlayer to be arranged between in each case two first interlayers. Preferably, however, in each case a plurality of second interlayers follow on from the first interlayers, when viewed in the direction of the axis of rotation.

The material of the first interlayers can be determined as required. Preferably, the first interlayers consist of a fiber composite material, for example from a carbon fiber-reinforced plastic (CFRP) or glass fiber-reinforced plastic (GFRP). The same applies, if present, to the second interlayers.

It is possible for the first interlayers to be used exclusively for fixing the stator stack, i.e. to exclusively implement the mechanical supporting function of the stator stack. Preferably, the first interlayers additionally provide a heat-conducting function, however. For this purpose, provision can be made in particular for the first interlayers to consist of a material which has a preferred heat-conducting direction. Such materials, in particular carbon fiber-reinforced plastics, are known to those skilled in the art. In the case of such a material, the preferred heat-conducting direction is preferably oriented radially or tangentially with respect to the axis of rotation within the stator stack and away from the stator stack outside of the stator stack.

It is possible for heat-dissipating elements such as cooling ribs or the like to be arranged on the connecting structure.

Preferably, provision is made for the connecting structure to have a number of substructures, the substructures each to have a central layer, which does not contain any of the first interlayers, and the central layers to be delimited on both sides in each case by a group of first interlayers, when viewed in the direction of the axis of rotation. By virtue of this configuration, a very stable connecting structure which can be subjected to loads results in a particularly simple manner.

The number of first interlayers per group of first interlayers can be as required. It is possible for the corresponding number to be equal to one. This can be expedient in particular when the second interlayers are present. Alternatively, it is possible for the corresponding number to be greater than one, for example three to six. This can be expedient in particular when no second interlayers are present, i.e. in each case a first interlayer is arranged between all stator laminations.

The central layers can be formed as required. For example, it is possible for the central layers to consist of structural foam. Alternatively, the central layers can consist of a sandwich structure. In this case, the sandwich structure preferably has two covering layers and one honeycomb structure arranged between the covering layers.

In general, the connecting structure has at least two such substructures. It is possible for a single group of first interlayers to simultaneously adjoin the central layer of both substructures. Alternatively, it is possible for the mutually facing groups of first interlayers of the substructures to be spaced apart from one another, when viewed in the direction of the axis of rotation. In this case, the two substructures can delimit a cavity axially on both sides, for example. In this case, through-openings for feeding cooling medium into the cavity and for feeding the cooling medium out of the cavity are preferably arranged in the substructures. In particular in this configuration, the connecting structure is often formed over the full area tangentially, when viewed around the axis of rotation.

Alternatively, it is possible for the connecting structure to have a number of spoke-like connecting struts, which connect the stator stack to the basic body. In this case, the first interlayers are parts of the connecting struts.

In general, the connecting struts are flat. In this case, first interlayers are located at least on the upper side and the lower side of the (flat) connecting struts.

The connecting struts extend from the stator stack to the basic body in the direction of a respective main axis. In a preferred configuration of embodiments of the present invention, provision is made for the connecting struts to be rotated about the respective main axis. As a result, the connecting struts can act as guide elements for cooling air, which is supplied to the connecting structure in the axial direction, i.e. in a direction parallel to the axis of rotation.

Alternatively, it is possible for the connecting struts to run in each case in a radial plane which is orthogonal to the axis of rotation, for the connecting struts to overlap a respective angular region, when viewed around the axis of rotation, for the connecting struts extending in the respective radial plane to only overlap part of a full circle, when viewed around the axis of rotation, per radial plane, and for the angular regions overlapped by the connecting struts extending in the respective radial plane to differ from one another with respect to at least two radial planes.

For example, a number of connecting struts which each overlap a specific angular region can be provided per radial plane. The connecting struts are generally arranged distributed uniformly within the respective radial plane. The connecting struts in the next radial plane can be offset with respect to the connecting struts in the first-mentioned radial plane by an offset angle, for example. The offset angle is preferably equal to or slightly less than the angular region. The whole process can be repeated for the subsequent radial plane, with the result that, when viewed over several radial planes, a coil-like configuration is gradually achieved. By virtue of such a configuration, the cooling effect of a cooling air flow supplied to the connecting structure can be optimized, for example.

Alternatively, it is possible for the connecting struts to extend from the stator stack to the basic body in the direction of a respective main axis and for the respective main axis to have, in addition to a component radial to the axis of rotation, a respective component axial to the axis of rotation. By virtue of this configuration, a particularly stable fixing of the stator stack relative to the basic body can be achieved in a particularly simple manner. This applies very especially when the respective main axis additionally has a respective component tangential to the axis of rotation. Such a spoke-like structure is a generally known approach in the case of wheels of bicycles and motorbikes, for example.

Embodiments of the invention can be realized irrespective of whether the rotor is in the form of an internal rotor or an external rotor. All of the advantages of embodiments of the present invention are shown, however, when the rotor is in the form of an external rotor. The device according to embodiments of the invention can moreover be designed as required. Particularly preferred, however, is an application in the field of aeronautics, i.e. when the basic body is part of an aircraft, in particular a helicopter.

BRIEF DESCRIPTION

Some of the embodiments will be described in detail, with reference to the following figures, wherein like designations denote like members, wherein.

DETAILED DESCRIPTION

Figure 1:
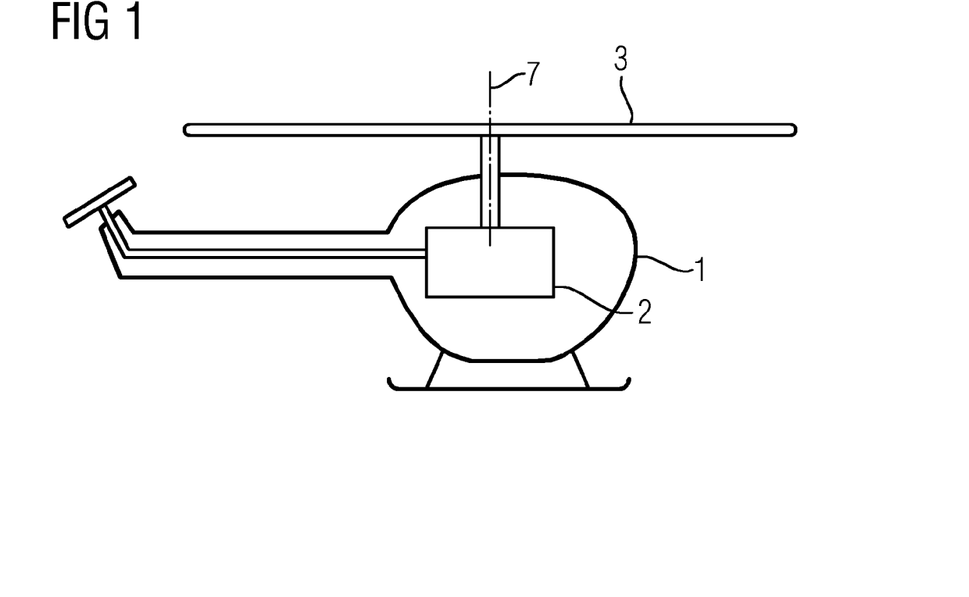
FIG. 1 shows a device comprising an electric machine.

As shown in FIG. 1, a device, in principle any desired device, has a basic body 1. As shown in FIG. 1, the basic body 1 is part of an aircraft, namely a helicopter. However, this illustration is purely by way of example. In principle, the basic body 1 could have any desired configuration.

An electric machine 2 is arranged in the basic body 1. The electric machine 2 drives a generator set 3 of the device. In particular, the electric machine 2 can be in the form of the main drive for the device. In the case of an aircraft, the generator set 3 is in the form of an airscrew generating propulsion and/or uplift. The word "rotor" in this context is avoided intentionally because it is required later as such in connection with the electric machine 2.

Figure 2:
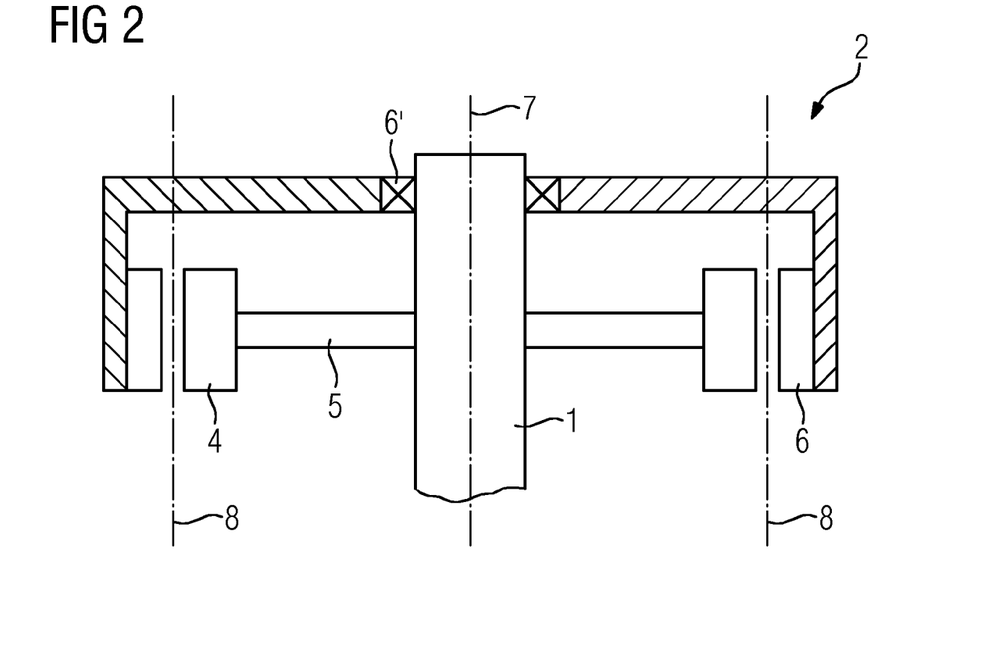
FIG. 2 shows a longitudinal section through an electric machine.

As shown in FIG. 2, the electric machine 2 has a stator stack 4. The stator stack 4 is connected to the basic body 1 via a connecting structure 5, as shown in FIG. 2. The electric machine 2 furthermore has a rotor 6. The rotor 6 interacts electromagnetically with the stator stack 4. Therefore, the electromotive force is formed between the stator stack 4 and the rotor 6. The rotor 6 is mounted in (at least) one bearing 6', so that the rotor 6 is rotatable about an axis of rotation 7.

Where the terms "axial", "radial" and "tangential" are used below, they always relate to the axis of rotation 7. Axial is a direction parallel to the axis of rotation 7. Radial is a direction orthogonal to the axis of rotation 7 towards the axis of rotation 7 or away from the axis of rotation 7. Tangential is a direction orthogonal to the axis of rotation 7 and orthogonal to the radial direction. Tangential is therefore a direction which is directed in the form of a circle around the axis of rotation 7 with a constant radial spacing and a constant axial position.

The stator stack 4 is fixed relative to the basic body 1 by means of the connecting structure 5. The stator stack 4 is therefore fixed both radially and axially relative to the basic body 1 by means of the connecting structure 5 and is furthermore also fixed in such a way as to prevent rotation about the axis of rotation 7.

As shown in FIG. 2, the rotor 6 is in the form of an external rotor. In the further Figures as well, a configuration of the electric machine 2 in which the rotor 6 is in the form of an external rotor is always explained. In principle, the rotor 6 could likewise be in the form of an internal rotor, however. It would only be necessary to perform a mirror inversion along a fictitious cylindrical mirror contour 8. The mirror contour 8 is indicated by dash-dotted lines in FIG. 2. It will be mentioned that the mirror contour 8 is a purely fictitious contour, i.e. not an actually existing object.

Figure 3:
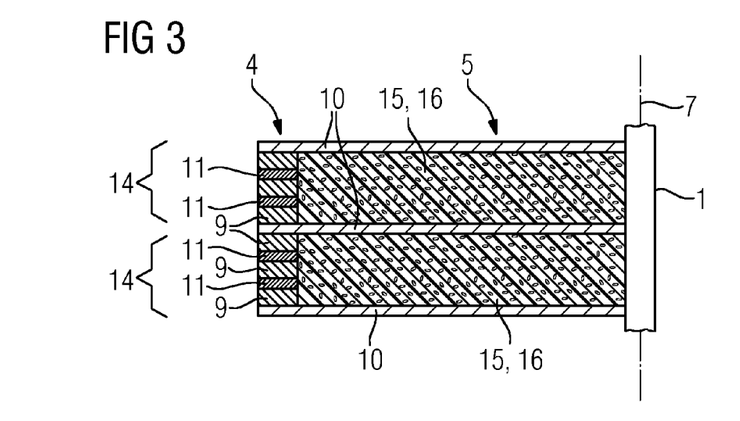
FIGS. 3 and 4 each show a stator stack and a connecting structure.
Figure 4:
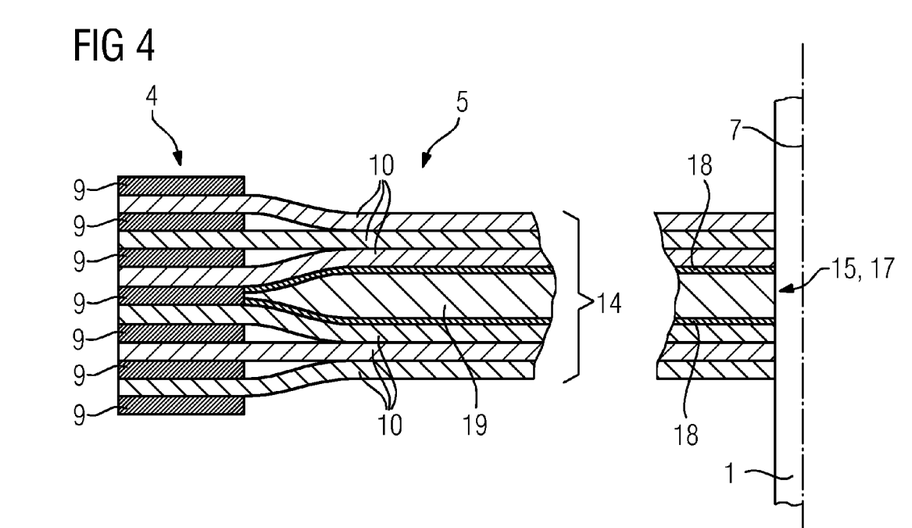

As shown in FIGS. 3 and 4, the stator stack 4 has a number of stator laminations 9. The stator laminations 9 are stacked one on top of the other, when viewed in the axial direction. As shown in FIGS. 3 and 4, in each case a first interlayer 10 is arranged at least between some of the stator laminations 9. The first interlayers 10 are parts of the connecting structure 5. The torque exerted by the stator stack 4 on the rotor 6 (i.e. the electromotive force) is introduced into the connecting structure 5 via the first interlayers 10.

In the configuration shown in FIG. 4, in each case a first interlayer 10 is arranged between all of the stator laminations 9. In the configuration shown in FIG. 3, on the other hand, in each case a first interlayer 10 is arranged only between some of the stator laminations 9. In the case of those stator laminations 9 between which no first interlayer 10 is arranged in the configuration shown in FIG. 3, a second interlayer 11 is arranged in each case. The difference between the first interlayers 10 and the second interlayers 11 consists in that the second interlayers 11, in contrast to the first interlayers 10, are not parts of the connecting structure 5. In other words: the second interlayers 11 can have a smaller contour than the first interlayers 10, when viewed in cross section orthogonal to the axis of rotation 7. In particular, the second interlayers 11 can have the same cut as the stator laminations 9. The first interlayers 10, on the other hand, need to extend towards the basic body 1 beyond the cut of the stator laminations 9.

The first interlayers 10 consist of a material which is electromagnetically inactive. For example, the first interlayers 10 can consist of a fiber composite material. Suitable fiber composite materials are, for example, carbon fiber-reinforced plastics or glass fiber-reinforced plastics. The second interlayers 11, if provided, are also electromagnetically inactive. They can, but do not need to, consist of the same material as the first interlayers 10.

According to the configuration shown in FIG. 3, in each case a plurality of second interlayers 11 follow on from the first interlayers 10, when viewed in the direction of the axis of rotation 7. This configuration, namely that more second interlayers 11 are provided than first interlayers 10 in the case of the presence of the second interlayers 11, is preferred but not essential. The number of second interlayers 11 which is located between in each case two first interlayers 10 can be determined as required. In general, this number is between three and six.

Figure 5:
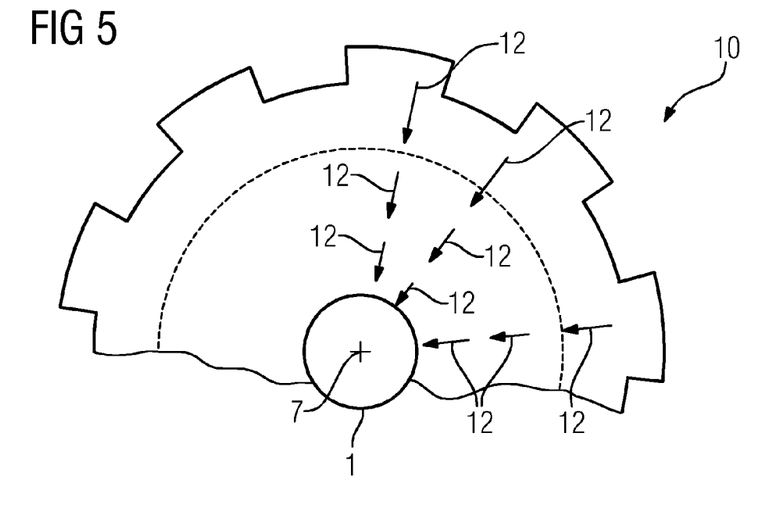
FIGS. 5 and 6 each show a plan view of a first interlayer.
Figure 6:
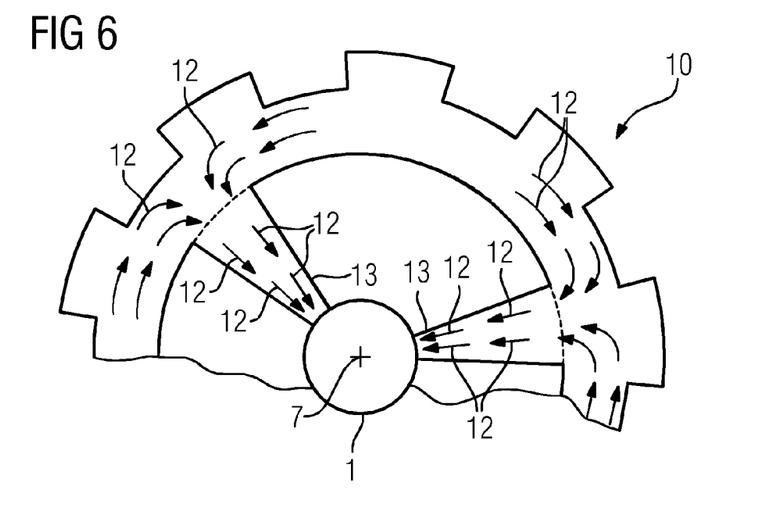

It is possible for the first interlayers 10 to consist of a material which has a preferred heat-conducting direction. For example, some carbon fiber-reinforced plastics have such a property. If the first interlayers 10 consist of such a material, the preferred heat-conducting direction is preferably oriented radially or tangentially to the axis of rotation 7 within the stator stack 4 and away from the stator stack 4 outside of the stator stack 4. FIGS. 5 and 6 show corresponding possible configurations.

In the configuration shown in FIG. 5, the first interlayer 10 consists substantially of solid material. The first interlayer 10 therefore extends radially inwards over the full area, starting from the contour of the stator laminations 9, illustrated by dashed lines in FIG. 5. In such a configuration of the first interlayer 10, the preferred heat-conducting direction, indicated by arrows 12 in FIG. 5, can be oriented radially both within and outside of the stator stack 4.

In the configuration shown in FIG. 6, on the other hand, the first interlayer 10 consists of solid material only in the region of the stator laminations 9. Starting from the contour of the stator laminations 9, also illustrated by dashed lines in FIG. 6, only spoke-like fingers 13 of the first interlayer 10 protrude radially inwards, also referred to below as connecting struts 13. The number of fingers 13 can be selected as required. Further details will be given in this regard later. In such a configuration of the first interlayers 10, the preferred heat-conducting direction should be oriented away from the stator stack 4 in the region of the connecting struts 13, orientated tangentially in the region of the stator stack 4 in the angular regions between the connecting struts 13 and go from a tangential orientation to a radial orientation in the angular regions of the connecting struts 13.

It is possible for heat-dissipating elements to be arranged on the connecting structure 5. Preferably, however, the connecting structure 5 itself is already in the form of a cooling device for the stator stack 4.

As shown in FIGS. 3 and 4, the connecting structure 5 has a number of substructures 14. Each substructure 14 has a central layer 15. The central layers 15 do not contain any of the first interlayers 10. The central layers 15 are delimited axially on both sides in each case by a group of first interlayers 10.

As shown in FIG. 3, the central layers 15 consist of structural foam 16. As shown in FIG. 4, the central layers 15 consist of a sandwich structure 17. The sandwich structure 17 for its part has two covering layers 18 and a honeycomb structure 19. The covering layers 18 each adjoin one of the groups of first interlayers 10. FIGS. 3 and 4 explain the configuration of the central layers 15 as structural foam 16 in conjunction with the presence of the second interlayers 11 and the configuration of the central layers 15 as a sandwich structure 17 in conjunction with the arrangement of the first interlayers 10 between all of the stator laminations 9. However, this is not essential. The structural foam 16 could likewise be implemented in conjunction with the arrangement of the first interlayers 10 between all of the stator laminations 9, and the sandwich structure 17 in conjunction with the presence of the second interlayers 11.

The number of first interlayers 10 per group of first interlayers 10 can be selected as required. It can be 1 (see FIG. 3, for example) or greater than 1, for example between three and six (see FIG. 4, for example).

Figure 7:
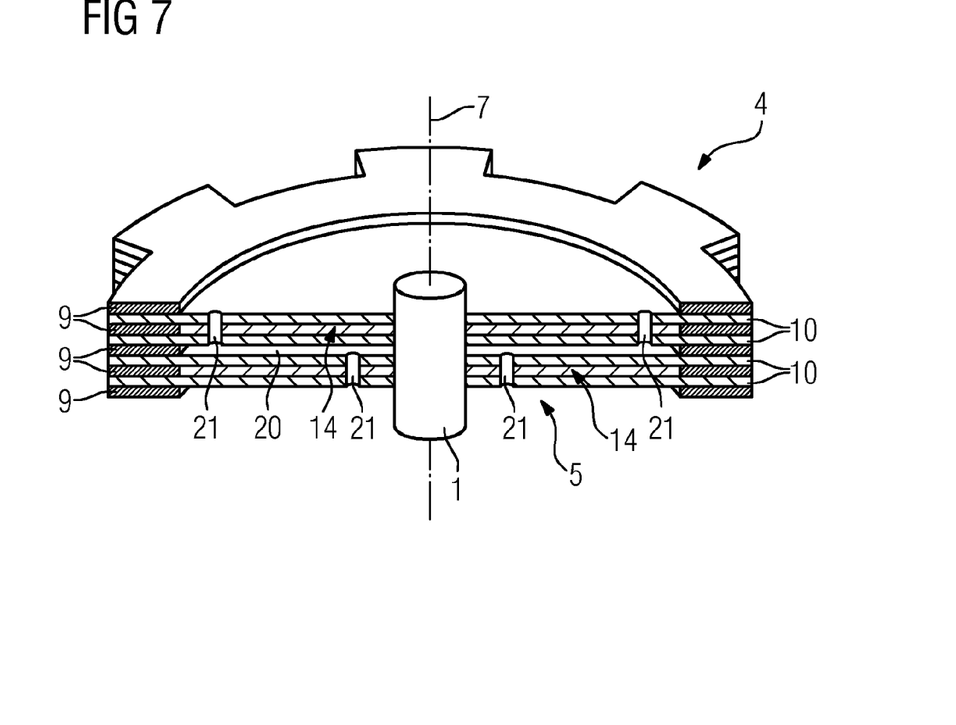
FIGS. 7 and 8 each show a stator stack and a connecting structure.

In general, a plurality of substructures 14 is provided. It is possible for the substructures 14 to merge with one another, when viewed in the direction of the axis of rotation 7, i.e. for a group of first interlayers 10 to simultaneously adjoin two central layers 15. Purely by way of example, this is illustrated in FIG. 3. As an alternative, it is possible for the mutually facing groups of first interlayers 10 of the substructures 14 to be spaced apart from one another, when viewed in the direction of the axis of rotation 7, as shown in FIG. 7. In this case, two substructures 14, which follow on from one another axially, preferably delimit a cavity 20 axially on both sides. The cavity 20 is in this case radially delimited firstly by the stator stack 4 and secondly by the basic body 1.

Through-openings 21 for feeding a cooling medium into the cavity 20 and for feeding the cooling medium out of the cavity 20 can be arranged in the substructures 14. The cooling medium is preferably a liquid cooling medium, for example water. The arrangement of the through-openings 21 is preferably such that the cooling medium flows over the first interlayers 10 over their entire area. For example, the through-openings 21 corresponding to the illustration in FIG. 7 can be arranged radially inwards in the case of one substructure 14 and radially outwards in the case of the other substructure 14. Other configurations are also possible.

Figure 8:
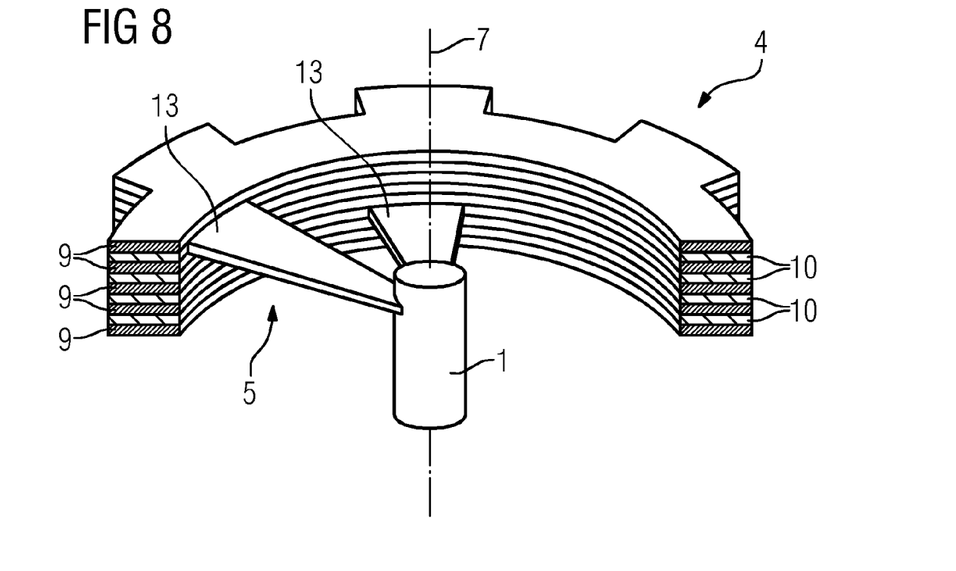

In accordance with a further configuration, the connecting structure 5 shown in FIG. 8 has the spoke-like connecting struts 13 already mentioned in conjunction with FIG. 6. The connecting struts 13 connect the stator stack 4 to the basic body 1. The first interlayers 10, as already mentioned, are parts of the connecting struts 13. The connecting struts 13 are generally flat.

In the configuration shown in FIG. 8, also see FIG. 9, the individual connecting struts 13 each overlap a certain angular region a, referred to below as overlap angle α, when viewed tangentially with respect to the axis of rotation 7. The overlap angle α can be approximately 30°, purely by way of example.

Figure 9:
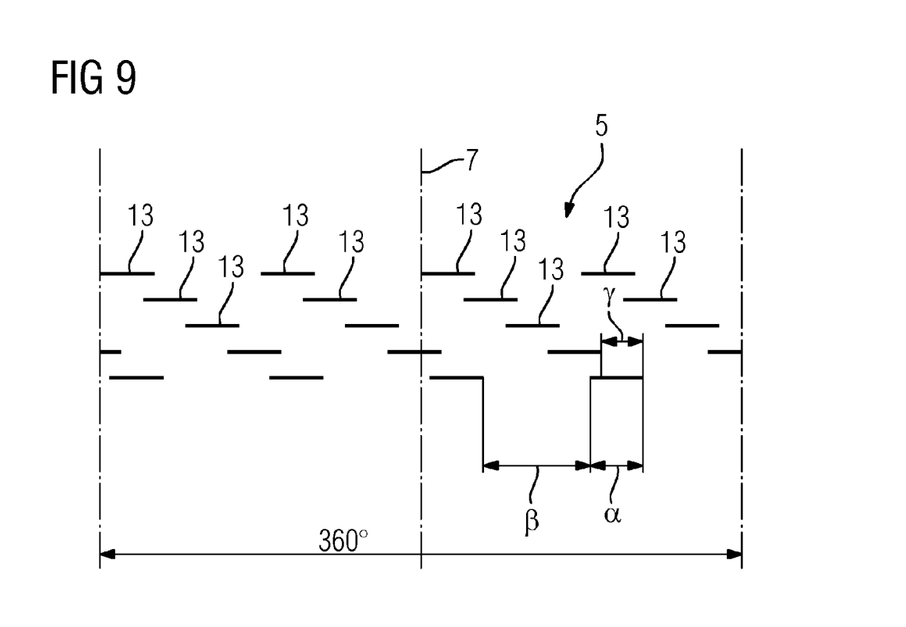
FIG. 9 shows a developed illustration of an arrangement of connecting struts.

In the configuration shown in FIGS. 8 and 9, the connecting struts 13 each extend in a radial plane orthogonal to the axis of rotation 7. In general, a plurality of connecting struts 13, for example in each case four connecting struts 13 corresponding to the illustration in FIG. 9, are provided per radial plane. The connecting struts 13 are generally arranged distributed uniformly within the respective radial plane. Therefore, an angular gap 13, i.e. 60° in accordance with the above example of four connecting struts 13 which each overlap by 30°, is between the connecting struts 13 of the respective radial plane. Furthermore, the connecting struts 13 are generally arranged in a plurality of radial planes, for example in five radial planes corresponding to the illustration in FIG. 9. The connecting struts 13 are offset with respect to one another through an offset angle γ from radial plane to radial plane. The angular regions a overlapped by the connecting struts 13 extending in one of the radial planes are therefore different from the angular regions a which are overlapped by the connecting struts 13 extending in at least one other radial plane.

The offset angle γ can be selected as required. It is possible for the offset angle γ to be (slightly) less than the overlap angle α, for example approximately 25°. Alternatively, it may be equal to the overlap angle α or even greater than the overlap angle α.

Figure 10:
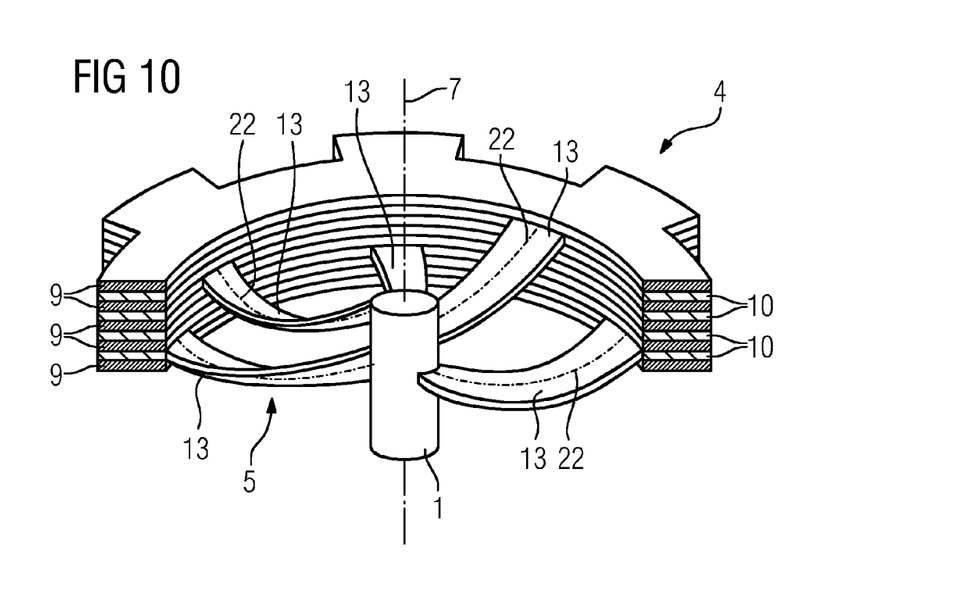
FIGS. 10 and 11 each show a stator stack and a connecting structure.

As shown in FIG. 8 and also as shown in FIG. 10, the connecting struts 13 extend from the stator stack 4 to the basic body 1 in the direction of a respective main axis 22. As shown in FIG. 10, the connecting struts 13 are rotated about the respective main axis 22. The connecting struts 13 therefore act as air-conducting elements by means of which a cooling air flow, which is supplied axially to the connecting structure 5, is guided by the connecting structure 5 in a manner which is favorable in terms of flow and cooling technology. The respective main axis 22 can change its direction on its way from the stator stack 4 to the basic body 1, as shown in FIG. 10.

Figure 11:
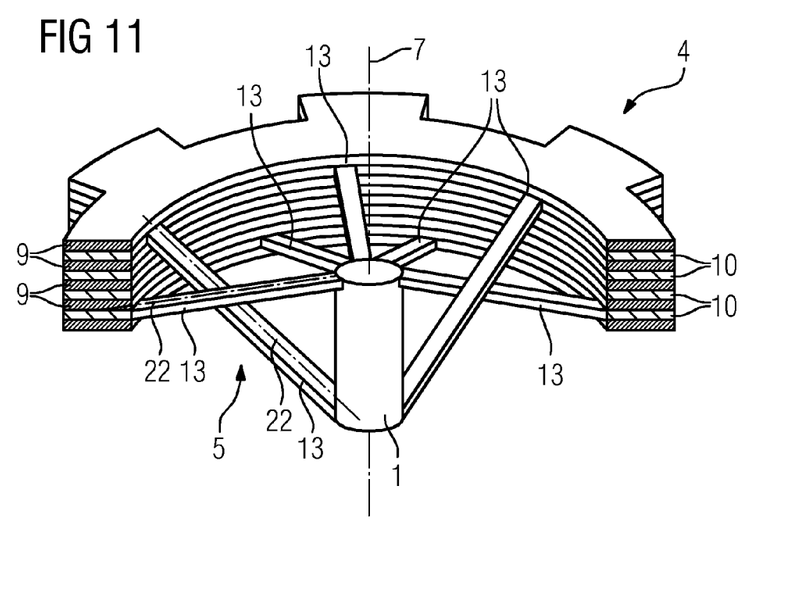
Figure 12:
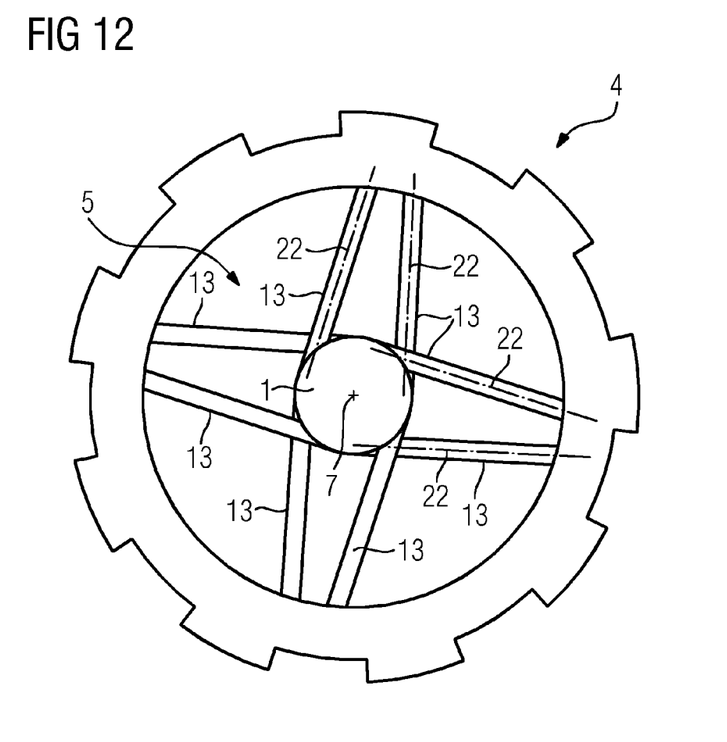
FIG. 12 shows a plan view of a stator stack and a connecting structure.

Even in the case of the illustration shown in FIGS. 11 and 12, the connecting struts 13 extend from the stator stack 4 to the basic body 1 in the direction of their respective main axis 22. In this configuration, the respective main axis 22 is purely linear. As shown in FIGS. 11 and 12, the main axes 22 of the connecting struts 13 have, in addition to a component radial to the axis of rotation 7, a respective component axial to the axis of rotation 7, however. As can be seen particularly clearly from FIG. 12, the main axes 22 even additionally have a respective component tangential to the axis of rotation 7. The main axes 22 are oriented in such a way that, in the case where the axis of rotation 7 is oriented vertically (perpendicular), the main axes 22 extend upwards on their path from the stator stack 4 to the basic body 1 for a first proportion of the main axes 22 and the main axes 22 extend downwards on their path from the stator stack 4 to the basic body 1 in the case of a second portion of the main axes 22. Similarly, the main axes 22 shown in FIG. 12 can also have tangential components in opposition to one another. If it is known in advance, however, owing to the intended application, wherein the rotor 6 always rotates in the same direction of rotation, it may be advantageous if the main axes 22 have tangential components in the same direction. As a result, by virtue of such a configuration, a very lightweight and nevertheless very stable connection between the stator stack 4 and the basic body 1 is achieved.

Embodiments of the present invention have many advantages. In particular, by virtue of the integration of active and passive parts by means of the first interlayers 10 of the connecting structure 5, a relatively simple, inexpensive and very lightweight solution for an electric machine 2 can be provided, whose performance potential during continuous operation can be maintained virtually to the full extent in comparison with a conventional electric machine.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A device,
   wherein the device has a basic body,
   wherein a stator stack of an electric machine is connected to the basic body via a connecting structure,
   wherein the electric machine has a rotor, which interacts electromagnetically with the stator stack and is rotatably mounted relative to the stator stack so that the rotor is rotatable about an axis of rotation,
   wherein the stator stack is fixed relative to the basic body by means of the connecting structure,
   wherein the stator stack has a number of stator laminations, which are stacked one on top of the other, when viewed in the direction of the axis of rotation,
   wherein the number of stator laminations are separated from the basic body;
   wherein
      electromagnetically inactive first interlayers are arranged at least between some of the stator laminations,
         wherein at least the stator laminations between which the first interlayers are arranged are spaced apart from one another;

the first interlayers are parts of the connecting structure, and a torque exerted by the stator stack on the rotor is introduced into the connecting structure via the first interlayers.

2. The device as claimed in claim 1, wherein each case one first interlayer is arranged between all of the stator laminations.

3. The device as claimed in claim 1, wherein electromagnetically inactive second interlayers are arranged between those stator laminations between which no first interlayer is arranged, and in that the second interlayers are not part of the connecting structure.

4. The device as claimed in claim 3, wherein in each case a plurality of second interlayers follow on from the first interlayers, when viewed in the direction of the axis of rotation.

5. The device as claimed in claim 1, wherein the first interlayers consist of a fiber composite material.

6. The device as claimed in claim 1, wherein the first interlayers consist of a material which has a preferred heat-conducting direction, in that the preferred heat-conducting direction is oriented radially or tangentially with respect to the axis of rotation within the stator stack and away from the stator stack outside the stator stack.

7. The device as claimed in claim 1, wherein heat-dissipating elements are arranged on the connecting structure.

8. The device as claimed in claim 1, wherein the connecting structure has a number of substructures, in that the substructures each have a central layer, which does not contain any of the first interlayers, and in that the central layers are delimited on both sides in each case by a group of first interlayers, when viewed in the direction of the axis of rotation.

9. The device as claimed in claim 8, wherein the central layers consist of a structural foam or a sandwich structure, wherein the sandwich structure has two covering layers and a honeycomb structure arranged between the covering layers.

10. The device as claimed in claim 8, wherein the connecting structure has at least two substructures, in that the mutually facing groups of first interlayers of the substructures are spaced apart from one another, when viewed in the direction of the axis of rotation, in that the two substructures delimit a cavity axially on both sides, and in that through-openings for feeding a cooling medium into the cavity and for feeding the cooling medium out of the cavity are arranged in the substructures.

11. The device as claimed in claim 1, wherein the connecting structure has a number of spoke-like connecting struts, in that the connecting struts connect the stator stack to the basic body, and in that the first interlayers are part of the connecting struts.

12. The device as claimed in claim 11, wherein the connecting struts are flat.

13. The device as claimed in claim 12, wherein the connecting struts extend from the stator stack to the basic body in the direction of a respective main axis, and in that the connecting struts are rotated about the respective main axis.

14. The device as claimed in claim 12, wherein the connecting struts each extend in a radial plane orthogonal to the axis of rotation, in that the connecting struts overlap a respective angular region (a), when viewed around the axis of rotation, in that the connecting struts extending in the respective radial plane only overlap part of a full circle, when viewed around the axis of rotation, per radial plane, and in that the angular regions (a) overlapped by the connecting struts extending in the respective radial plane are different from one another, with respect to at least two radial planes.

15. The device as claimed in claim 11, wherein the connecting struts extend from the stator stack to the basic body in the direction of a respective main axis, and in that the respective main axis has, in addition to a component radial to the axis of rotation, a respective component axial to the axis of rotation.

16. The device as claimed in claim 15, wherein the respective main axis additionally has a respective component tangential to the axis of rotation.

17. The device as claimed in claim 1, wherein the rotor is in the form of an external rotor.

18. The device as claimed in claim 1, wherein the basic body is part of a helicopter.

* * * * *